Dec. 29, 1970      W. L. FRETZ      3,550,248

METHOD OF PERFORATING TUBES

Filed March 29, 1968

INVENTOR.

William L. Fretz

BY

Bernard, McGlynn & Reising

ATTORNEYS

United States Patent Office 3,550,248
Patented Dec. 29, 1970

3,550,248
METHOD OF PERFORATING TUBES
William L. Fretz, Souderton, Pa., assignor to Teleflex Incorporated, North Wales, Pa., a corporation of Delaware
Filed Mar. 29, 1968, Ser. No. 717,204
Int. Cl. B21d 53/12; B23p 15/16, 17/00
U.S. Cl. 29—423    13 Claims

ABSTRACT OF THE DISCLOSURE

In a preferred form, the present invention relates to a method of forming apertures in the periphery of a flexible, hollow member by means of lowering the temperature of a fluid introduced into the hollow member and the hollow member itself to a predetermined point to obtain a desired rigidity to support a machining operation and then drilling or cutting apertures in the wall of the rigidified hollow member. The hollow member is also supported externally to maintain a desired dimension during the temperature changes by a fixturing device engaging the outside surface of the hollow member in the area where the temperature change takes place.

---

The present invention relates to methods of machining and, more particularly, to a method for forming apertures in the periphery of a flexible tubulous member.

Forming apertures in a flexible, hollow member such as a tube of Teflon is very difficult in that the Teflon is normally too flexible to support the drill or cutting wheel. This problem is particularly difficult to overcome when the apertures to be machined in a Teflon tube are required to be dimensionally accurate. It is obvious that a plastic or Teflon-type material has a sufficiently low coefficient of friction so that it is difficult to start a drill therein and pressure is necessarily required to initiate the penetration of the wall. Even when this can be accomplished in a Teflon tube that is self-supporting, it is extremely difficult to maintain a particular dimension as the drill breaks into the inside portion of the outside wall. The plastic or Teflon tends to stretch and the hole that is drilled is frusto-conical in shape.

In a motion transmitting remote control assembly that utilizes a Teflon tube as a ball cage, it is necessary that the apertures of the Teflon in which the balls are held be dimensionally accurate so as to reduce the friction and increase the positive operation of the remote control motion transmitting device. The subject invention provides a very simple and economical method for drilling dimensionally accurate holes in Teflon tubing that has particular utility in the environment of a remote control assembly.

The present invention contemplates the forming of the apertures in the periphery of the flexible tubulous plastic member by introducing a fluid into said tubulous member, lowering the temperature of the tubulous member and the fluid so that the fluid congeals to form an interior support surface for the tubulous member with the flexible tubulous member also becoming rigid, placing the rigidified tubulous member in a fixturing device and cross-drilling the member to form a pair of apertures disposed 180° apart in the member. The tubulous member is then rotated 90° and another cross-drilling operation takes place in the rigidified tubulous member so that a series of four holes is placed approximately on the same plane perpendicular to the longitudinal axis of the tubulous member. It is obvious that, if a heavier tubulous member were provided, the hole drilling would be simpler but in the environment of a motion transmitting remote control assembly, the tubulous member or ball cage must be sufficiently flexible to move around turns in the outer conduit necessarily making a heavier cage inappropriate for operation in this environment.

When a fluid is introduced into the tubulous member and frozen, the member has a tendency to be enlarged in dimension and so the present invention provides means for controlling this dimensional change. The tubulous member when used as a cage for balls in a roller friction remote control assembly must have apertures that are small enough to restrain the balls but large enough to allow them to roll. Consequently, this dimensioning of the apertures is very important. A fixturing device for holding the tubulous member while drilling is taking place also includes a tube holder which is the same size as the desired outside dimension of the tubulous member. It is obvious that if water were frozen in a tubulous member and the member were drilled while in a stretched condition, the hole so formed would be smaller when the member warmed and resumed its normal dimension. This dimensional change is prevented by restraining the outside of the tubulous member by the tube holder with the member having a sufficiently low coefficient of friction to allow the sliding of the member through the fixturing device to carry out the inventive method. The restraint continues at each area of the tubulous member as that particular area goes in temperature from frozen to ambient.

Therefore, it is an object of the present invention to provide an improved method of forming apertures in a flexible tubulous member that is to be used as a ball cage in a roller friction remote control assembly.

It is another object of the present invention to provide an improved method for drilling holes through a soft or flexible tubulous member utilizing the inherent characteristic of plastic to harden under a lowering of temperature.

It is still another object of the present invention to provide an improved method for forming apertures in a flexible tubulous member by introducing a fluid into the tubulous member and freezing the fluid and lowering the temperature of the member so that the member is extremely rigid and the frozen or congealed fluid in the interior supports the machining operation.

Further objects and advantages of the present invention will be apparent from the following description, reference being had to the accompanying drawings wherein a preferred embodiment of the present invention is clearly shown.

Figure 1:
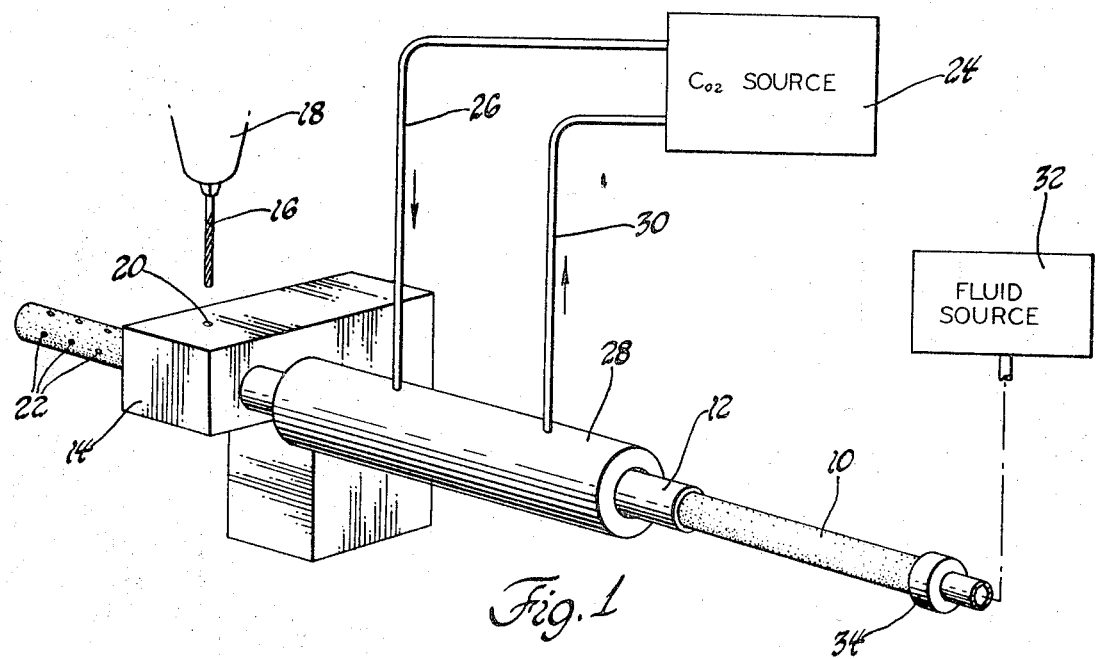
FIG. 1 is a perspective view of apparatus adapted to operate in accordance with the inventive method disclosed herein.

Referring to FIG. 1, a hollow, flexible tubulous member 10 is illustrated as passing into a tube holder 12 that is maintained in fixed relationship with respect to a fixturing block 14. Tubulous member 10 is composed of any well-known plastic material such as Teflon. Plastics are generally very flexible and, therefore, tube holder 12 is needed as a lead into the fixturing block 14 and as a dimensional control device to maintain the tubulous member 10 in exact perpendicularity relative to drill 16 and with a selected outside dimension. Drill 16 is held in chuck 18 which is reciprocal up and down as viewed in FIG. 1 into guide aperture 20. When drill 16 passes into aperture 20, holes or apertures 22 are formed in tubulous member 10. A cross drilling step is preferred but it is understood that any number of holes can be simultaneously formed as desired.

$CO_2$ source 24 circulates $CO_2$ through line 26 into blanket 28 which is wrapped around tube holder 12. It is understood that $CO_2$, Freon, or some other convenient freezing agent can be used. The return path for $CO_2$ is had through line 30 to the $CO_2$ source 24. Blanket 28 is a substantially hollow, cylindrical member which is in thermal conductive relationship with tube holder 12 and, therefore, as the $CO_2$ passes through the blanket 28, a lowering of the temperature is effected in tube holder 12 which is transmitted to the contacting tubulous member 10 passing therethrough.

Fluid source 32 supplies a fluid such as water to tubulous member 10 by a gravity feed and snap valve 34 allows water passage into the interior of tubulous member 10 until tubulous member 10 is drawn into tube holder 12 wherein snap valve 34 is pushed off tubulous member 10 and snaps shut in any well-known manner to prevent further water flow. The water flowing into tubulous member 10 will only flow as far as some portion of blanket 28 wherein it freezes or congeals within the member 10 and will not run within the member as far as the fixturing block 14. Therefore, it can be assumed that the portion of tubulous member 10 passing into fixing block 14 is completely filled with the congealed fluid and is properly dimensioned relative to the desired size of the tubulous member 10 as it is adapted to the condition wherein it is to be machined.

The method disclosed herein involves forming a flexible tubulous member from Teflon, introducing a fluid such as water into the tubulous member and lowering the temperature of the tubulous member and the fluid by by introducing $CO_2$ into a blanket surrounding the tubulous member along one area thereof so that the fluid congeals to form an interior support surface for the tubulous member, and the flexible tubulous member becomes sufficiently rigid to support a machining operation. Next, in order to insure dimensional accuracy of the apertures to be formed in tubulous member 10, the tubulous member 10 with the congealed fluid is placed in a fixturing device near the blanket to prevent melting of the congealed fluid and later the drilling apparatus moves into the supported periphery of the tubulous member and penetrates the near wall of the tubulous member 10, passes through the congealed fluid and exits through the opposite side of the tubulous member. In this manner, a pair of holes are cross-drilled that are on a plane substantially perpendicular to the longitudinal axis of the tubulous member. The drill is next withdrawn and the rigidified tubulous member is rotated 90° and the cross-drilling step is repeated so that four holes spaced 90° apart are formed in the tubulous member on the same plane with respect to the longitudinal axis of the tubulous member. If desired, these four holes can be formed simultaneously.

Rigidified tubulous member 10 is then fed either manually or through some indexing device along its longitudinal axis into the tube holder 12 of the fixturing block 14 to a new position so that a new series of cross-drilled holes can be formed on a plane spaced a predetermined distance from the plane of the first series of holes. The previous two steps are repeated until the tubulous member has passed in its entirety through the fixturing block and a series of cross-drilled holes have been formed at spaced intervals. As the tubulous member exits from the fixturing block 14, the congealed liquid will melt due to a rise in temperature as it gets further away from the $CO_2$ blanket 28 and the flexibility of the tubulous member 10 is thereby reestablished. Finally, the finished, drilled flexible tubulous member is removed from the fixture, and the apparatus is in condition for the next cycle of operation.

Figure 2:
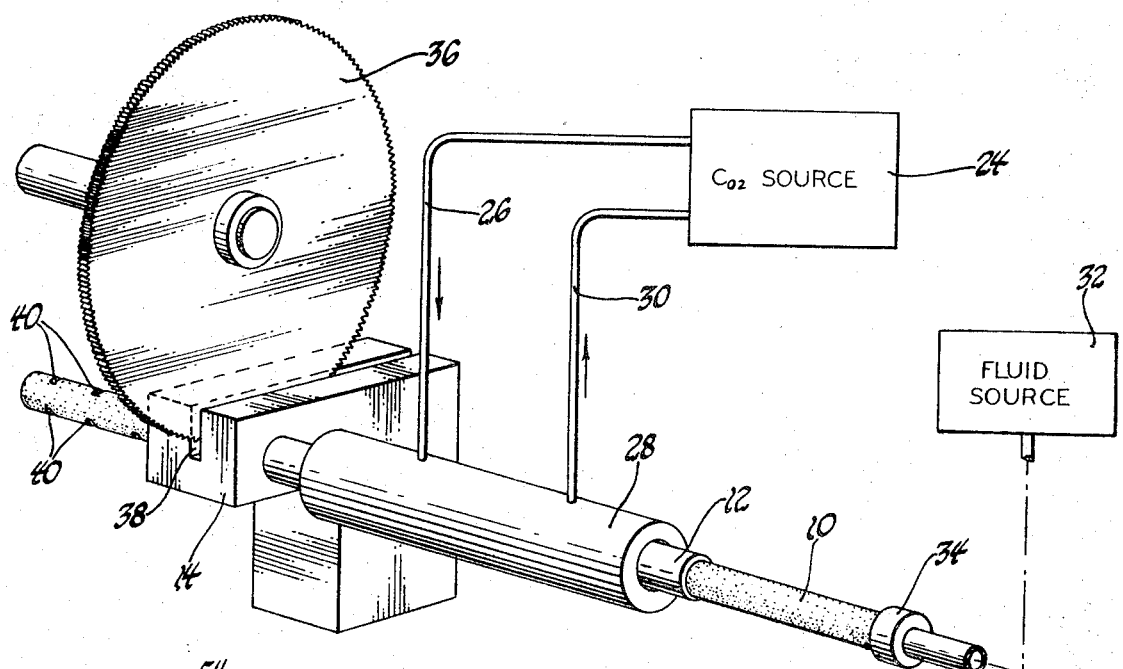
FIG. 2 is another embodiment of apparatus adapted to operate in conjunction with the inventive method disclosed herein.

Referring to FIG. 2, another embodiment of the subject invention is illustrated in that the drill 16 is replaced with a cutting wheel 36. Cutting wheel 36 projects into slot 38 formed in fixturing block 14 down to a level allowing apertures in the shape of apertures 40 to be formed in the periphery of tubulous member 10. The base of aperture 40, as viewed from the outside of tubulous member 10, is preferably a square having the same outer dimensions as the diameter of a ball which would repose in the slot when the tubulous member 10 is used in the operative environment of a motion transmitting remote control mechanism.

The embodiment of FIG. 2 is very similar to the embodiment of FIG. 1 in that a $CO_2$ source 24 circulates $CO_2$ through lines 26 and 30 into blanket 28 disposed around tube holder 12. Water from fluid source 32 passes into the end of tubulous member 10 and congeals or freezes when it passes a predetermined distance through blanket 28. Therefore, the tube 10, when it reaches the position where it is contacted by cutting wheel 36, is in a rigidified condition with a frozen support structure disposed therein. In much the same manner as described for the first embodiment, the flexible tubulous member 10 is indexed through fixture block 14 so that apertures 40 can be appropriately formed in the periphery thereof. It is obvious that in the case of this embodiment, apertures can be formed symmetrically on either side of tube 10 by rotating tube 10 or the indexing can take place and rotation of the tube can be effected which would put apertures anywhere in the periphery of tube 10, whether they be in opposed relationship to one another or progressively formed in the periphery thereof of sufficient numbers that balls reposing in the apertures would be appropriately spaced, and an operating core element would operate properly in an environment of a motion transmitting remote control mechanism of the type previously described.

The subject invention provides a novel method for drilling holes in a flexible plastic tube which otherwise requires some support internally when dimensionally accurate holes must be drilled. The present method contemplates the introduction of some congealable fluid into the tube so that when congealed, the appropriate support is had within the tube which is controlled from stretching by the fixturing device 14 and more specifically the tube 12 and as the tube is later withdrawn from the drilling position, the congealed fluid automatically liquifies and drops from the tube to leave the properly dimensioned drilled tube intact. The subject method is rather simple and it is obvious that the water used as the drilling support is inexpensive and the support that it provides within a tube is automatically dimensioned relative to the tubulous member by the freezing thereof within a tool holder that is easily maintained in dimension. Consequently, a machining operation that is, drilling dimensionally accurate holes in a flexible tube that formerly required sophisticated structure, is done with ease utilizing the method taught in the present invention.

Figure 3:
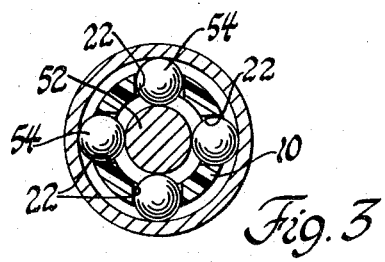
FIG. 3 is a sectional view of a roller friction remote control assembly.

In the environment of a roller friction remote control assembly, where the drilled tubulous members are used, a novel method of assembling is also taught. A roller friction remote control assembly as herein disclosed in FIG. 3 is composed of an outer conduit 50, a drilled tubulous member 10 smaller than the conduit adapted to fit inside, and a core element 52 fitting within the tubulous member and centered in the conduit by balls 54 that are carried in the drilled apertures on either side of the operating core element.

A remote control assembly is therefore formed by providing a tubulous member, lowering the temperature of the member and drilling dimensionally controlled apertures in the rigidified tubulous member. Next, an operating core element is inserted into the tubulous member and the tubulous member is pushed into the conduit. When the first aperture is about to go into the conduit, the tubulous member is stopped and balls are inserted into each aperture and placed against the operating core element. Then the tubulous member, ball, and core element are fed into the conduit where they are operatively retained until the next aperture or series of apertures are about to feed into the conduit. The previous step of ball insertion is repeated and the feeding of the tubulous member and core element into the conduit is continued until all of the tubulous member is within the conduit and the remote control assembly is complete.

While the embodiments of the present invention as herein disclosed constitute a preferred form, it is understood that other forms might be adopted.

The embodiments of the invention in which an exclusive property or privilege is claimed are defined as follows:

1. A method of forming apertures in the periphery of an elongated flexible tubulous member made of Teflon, the steps comprising: lowering the temperature of the tubulous member to a predetermined point wherein a desired rigidity of the tubulous member is achieved; introducing a fluid into said tubulous member; lowering the temperature of the tubulous member and the fluid by introducing $CO_2$ into a blanket surrounding the tubulous member along one area thereof so that the fluid congeals to form an interior support surface for the tubulous member and the flexible tubulous member becomes sufficiently rigid to support a machining operation; placing a tubulous member with the congealed fluid in an aperture of a fixturing device having a selected dimension near the blanket; drilling apertures in the periphery of the tubulous member in the fixture in a spaced manner around the tubulous member and penetrating the congealed liquid to form a drilled hole on the opposite side of the rigidified tubulous member from the point of drill entry, thereby cross drilling a pair of holes; withdrawing the drill and rotating the rigidified tubulous member 90° and repeating the cross drilling step to form four holes spaced 90° apart on the same plane with respect to the longitudinal axis of the tubulous member; moving the rigidified tubulous member along its longitudinal axis in the fixturing device to a new position so that a new series of cross drilled holes can be formed on a plane spaced a predetermined distance from the plane of the first series of holes; repeatedly moving, drilling, rotating and cross drilling holes in the rigidified tubulous member along the length thereof to form a series of cross drilled holes at spaced intervals; allowing the congealed liquid to rise in temperature as a given area of the tubulous member moves further from the blanket containing $CO_2$ thereby reestablishing the flexibility of the tubulous member; removing the finished drilled flexible tubulous member from the fixture.

2. A method according to claim 1 wherein the apertures are formed by a cutting wheel which cuts slots thereby replacing the drilling operation.

3. A method according to claim 1 wherein the interior support surface for the drilling operation is automatically dimensioned with respect to the tubulous member by the freezing thereof in the controlled dimensioned tube holder.

4. A method according to claim 1 wherein the apertures are formed in one wall of the tubulous member at a time.

5. A method of forming a roller friction remote control assembly, the steps comprising: providing a flexible tubulous member; lowering the temperature of the tubulous member to gain a desired rigidity; forming apertures in the wall of the rigidified tubulous member along the length thereof; inserting an operating core element into the tubulous member; placing balls into the apertures on either side of the operating core element disposed in the tubulous member; inserting the assembled tubulous member, balls and operating core element incrementally into a conduit member; continuing the placing of balls into apertures on either side of the operating core element while feeding the tubulous member and core element further into the conduit to form an assembly in which the core element is spaced from an inner wall of the conduit by the balls and the tubulous member serves as a cage for the balls when the remote control assembly is in assembled disposition.

6. A method according to claim 5 wherein the flexible tubulous member is filled with a congealable fluid and the temperature of the fluid filled tubulous member is lowered to a desired point where the fluid is congealed and the tube is rigidified so that the congealed fluid within the tubulous member can support the outside wall of the tubulous member for a drilling operation thereon.

7. A method according to claim 5 wherein the outside diameter of the tubulous member is restrained in a fixturing device so that a desired dimension of an aperture to be formed is maintained constant from the time before the temperature of the tubulous member is lowered until after the temperature returns to ambient temperature.

8. The method according to claim 5 wherein the apertures are formed by drilling.

9. A method of forming an aperture in a plastic tubular member comprising the steps of: rigidifying said tubular member by exposing the latter to a rigidifying temperature, removing plastic material from the wall of said tubular member with a cutting tool to form at least one aperture therein, and rendering said tubular member flexible by exposing the latter to a temperature higher than said rigidifying temperature.

10. A method as set forth in claim 9 including the step of introducing a fluid into said tubulous member and subjecting said fluid to said rigidifying temperature.

11. A method as set forth in claim 10 further defined as surrounding said tubular member with a coolant to expose said tubular member to said rigidifying temperature.

12. A method as set forth in claim 11 including restraining the outside diameter of said tubular member as the latter is rigidified and said aperture is formed therein.

13. A method as set forth in claim 10 further defined as freezing said fluid whereby the fluid solidifies.

References Cited

UNITED STATES PATENTS

| | | | |
|---|---|---|---|
| 3,027,626 | 4/1962 | Murphy | 29—148.4C |
| 3,063,141 | 11/1962 | Scholl | 29—423 |
| 3,176,387 | 4/1965 | Argueso, Jr., et al. | 29—423 |
| 3,256,051 | 6/1966 | Howe | 308—201 |

THOMAS H. EAGER, Primary Examiner

U.S. Cl. X.R.

29—148.4, 163.5; 308—201